United States Patent [11] 3,574,444

| [72] | Inventor | Richard D. Hipp, Jr. |
| --- | --- | --- |
| | | Circle Pines, Minn. |
| [21] | Appl. No. | 743,408 |
| [22] | Filed | July 9, 1968 |
| | | Division of Ser. No. 389,160, Aug. 28, 1968, Pat. No. 3,431,967. |
| [45] | Patented | Apr. 13, 1971 |
| [73] | Assignee | Minnesota Mining and Manufacturing Company |
| | | St. Paul, Minn. |

[54] FRAME USEFUL AS LENS SUPPORT
6 Claims, 5 Drawing Figs.

[52] U.S. Cl. .................................................... 350/252,
350/257
[51] Int. Cl. ........................................................ G02b 7/02
[50] Field of Search........................................... 350/202,
252, 318, 252—257, 178; 285/O-ring (Digest);
351/83, 86, 154, 96

[56] References Cited
UNITED STATES PATENTS

| 2,458,817 | 1/1949 | Wolfram | 285/O-ring Digest |
| --- | --- | --- | --- |
| 1,539,830 | 6/1925 | Culver | 351/154X |
| 2,707,418 | 5/1955 | Magnuson | 350/252 |
| 2,497,147 | 2/1950 | Washam | 350/252 |
| 1,969,852 | 8/1934 | Markosek | 350/52 |

FOREIGN PATENTS

| 1,063,620 | 12/1953 | France | 285/O-ring Digest |
| --- | --- | --- | --- |
| 892,308 | 4/1944 | France | 351/86 |
| 959,284 | 3/1950 | France | 351/86 |

Primary Examiner—David Schonberg
Assistant Examiner—Michael J. Tokar
Attorney—Kinney, Alexander, Sell, Steldt and Delahunt ABSTRACT: Undercut framelike members, e.g. lens holders, which are produced by casting in two-piece single-draw injection molds, have an inner undercut groove tapering from maximum depth at one centerline to zero depth at the centerline perpendicular thereto and provide for stable support and easy removal of the lens.

PATENTED APR 13 1971
3,574,444
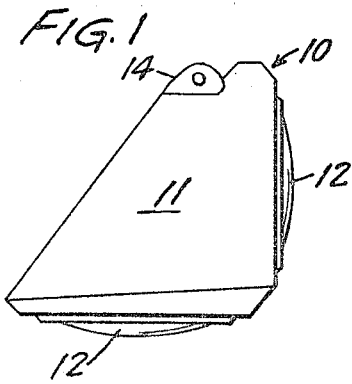
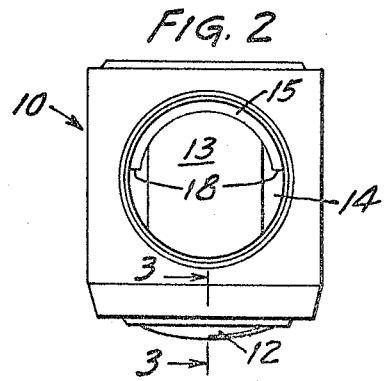
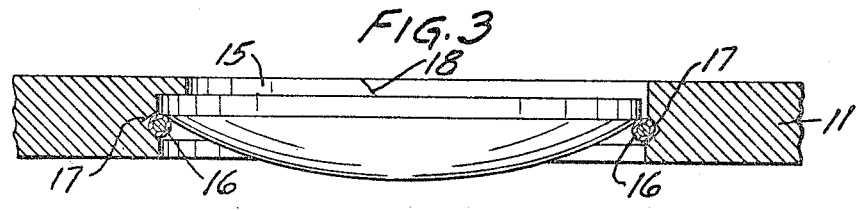
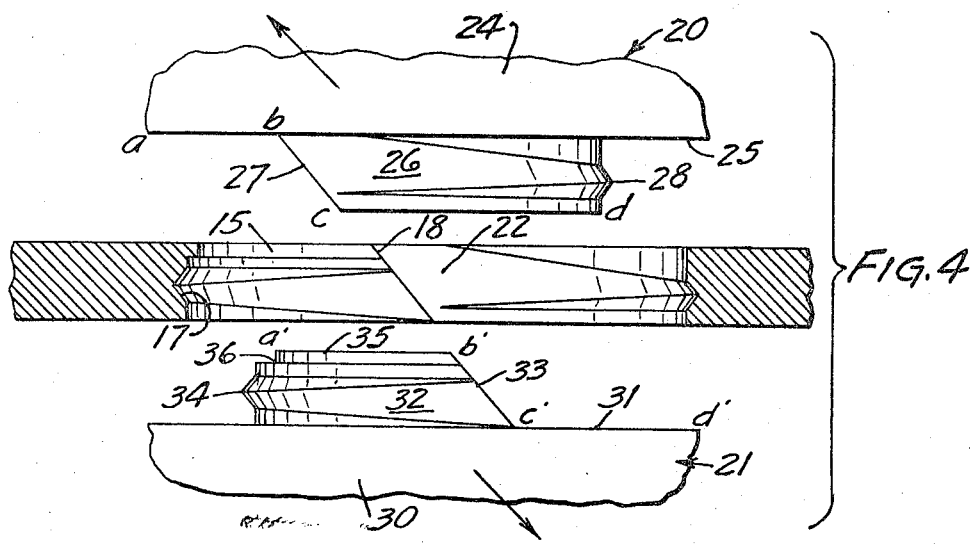
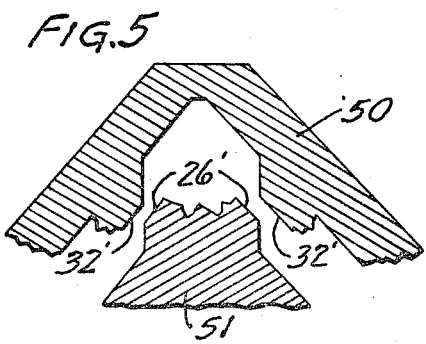
INVENTOR
RICHARD D. HIPP, JR.
BY Kinney, Alexander,
Sell, Steldt & DeLaHunt
ATTORNEYS

FRAME USEFUL AS LENS SUPPORT

This application is a division of my copending application Ser. No. 389,160, now U.S. Pat. No. 3,431,967.

This invention relates to rigid open-centered framelike or rimlike castings which may be made by casting in simple two-piece single-draw injection molds.

Although not restricted thereto, products made in accordance with the principles of the invention have found particular utility as lens holders and projection heads for overhead projectors and the invention will for convenience be described primarily in terms of such structure.

A form of projection head which has recieved widespread commercial acceptance consists essentially of a generally right triangularly cross sectioned metal housing having a plane mirror along the hypotenuse and a single lens at each of the other two sides. Prior to the present invention the lens mount rims were typically machined from the cast housing, in order to provide the required lens-supporting ledges and the grooves for the retaining rings. The machining process was both time consuming and expensive.

It has now been found possible to form a fully effective grooved lens support structure by simple injection molding procedures employing a split die. The molded support or rim is adequately grooved to permit permanent rigid retention of an inserted lens by means of a conventional expansion ring seal. Close tolerances and full rigidity of housing structure are obtained. Machining is eliminated.

These and other advantages are obtained, in accordance with the invention, by restricting the lens-supporting ledge of the frame member to slightly less than one-half the perimeter of the lens opening and by appropriately shaping the remaining interior surface of the rim to permit withdrawal of the two opposing mold sections at an acute angle with the plane of the frame or rim.

The invention will now be more fully explained and described by reference to the accompanying drawing, in which:

FIG. 1 is a side elevation of a typical projection head for an overhead projector;

FIG. 2 is a front elevation of the head of FIG. 1 with the upper lens removed;

FIG. 3 is a central cross section of the lower lens and lens mount portion of the device of FIG. 2 taken along line 3—3;

FIG. 4 is an exploded partial cross-sectional representation of a two-piece mold assembly and lens mount formed therein; and FIG. 5 is a partial representation in cross section of a mold assembly for use in molding the housing of the projection head of FIGS. 1 and 2.

The projection head 10 comprises a generally right triangular housing 11, having central circular lens-mount openings in the two side faces fitted with convex-concave lenses 12, and interiorly provided with a plane mirror 13 supported on a removable back member 14 forming the hypotenuse.

The lens 12 in each instance is supported against a narrow inner ledge 15 encircling slightly less than one-half the circumference of the lens-mount opening. The lens is held against the ledge and in place within the opening by split ring expansion seal member 16 which fits within a peripheral groove 17. The ends 18 of the ledge 15 are slanted outwardly at the same acute angle to the plane of the ledge as are the corresponding sides of the groove 17.

A two-piece mold consisting of a top half 20 and a bottom half 21, portions of which are represented in FIG. 4, is used in casting the housing 11. The two meet along the planes represented by line a, b, c, d of piece 20 and a', b', c', d' of piece 21. After the housing has been cast, the mold sections are separated from each other and from the casting in the direction indicated by the arrows, which will be seen to be parallel to the slant ends 18 of the ledge 15 and to the corresponding sides of the grooves 17 so that there is no obstruction to the separation at any point of the circumference of the lens holder.

In order to achieve the result just described it is necessary that the depth of the groove 17 be uniformly tapered to a flattened inner rim surface at the area 22 just beyond the ends 18 of the ledge 15 and at each side of the rim. At these areas the retaining ring 16 presses against the rim surface without being wedged toward the lens 12.

The split ring 16 consists of a curved length of spring steel piano wire coated with a resiliently conformable plastic sheath, and is snapped in place within the groove 17 and against the lens 12 under compression, with the adjoining ends preferably in line with the approximate center of the ledge 15. The lens is held firmly in place against the ledge by the ring. The plastic sheath conforms to the rim of the lens holder and to the glass surface of the lens to provide an essentially dust-tight seal, even though the lens itself may not contact the retaining rim other than at the surface of the supporting ledge 15.

The top mold member 20 will be seen to comprise a segment 24 having flat surface 25 carrying a generally semicylindrical raised boss 26 having a diametrical slant face 27 and provided with a ridge 28 tapering from maximum height opposite the slant face to zero height adjacent the ends of the slant face. Similarly, the bottom mold member 21 comprises a segment 30 having a flat surface 31 carrying a semicylindrical raised boss 32 having a diametrical slant face 33 and provided with a ridge 34 tapering from maximum height opposite the slant face to zero height adjacent the ends thereof. In addition the flat outer face 35 of the boss 32 is cut away along the arcuate edge to form a step groove 36 within which the lens-supporting ledge 15 is to be formed.

For simplicity the description of the mold and lens holder has been given in terms of a single holder or rim section. In forming the housing 11 of the projection head 10 it will be apparent that the two rim sections may be formed simultaneously. Thus it has been found expedient, as indicated in FIG. 6, to employ a hollow outer mold section 50 of generally V-shaped cross section carrying two projecting semicylindrical bosses 32', and a matching inner mold section 51 of generally wedge-shaped cross section carrying two projecting bosses 26', in the housing 11. The ease of assembly and disassembly of the mold is particularly apparent from consideration of this modification.

It will be appreciated that the remainder of the mold is of conventional design permitting the injection under pressure of plastic metal or other molding material and the subsequent cooling or hardening of the molded article. Zinc die casting alloy identified as "SAE 903" has been found acceptable for housings as illustrated in FIG. 1 and having overall dimensions of approximately 4½"×4½"×4", with lens openings designed for lenses of about 3½" diameter.

There has thus been provided a simplified mold structure and molding technique whereby lens mounts and other structure requiring peripheral retaining grooves may be produced rapidly and economically by simple die casting and without subsequent machining, by employing molds constructed of two members slidably separable from each other, and from the molded piece formed therebetween, by movement along a line at an acute angle to said piece and parallel to an edge of the retaining groove.

I claim:

1. A frame member surrounding an open central area, and adapted to readily releasably retain a split ring expansion seal member for holding a rigid optical element in said frame member, the inner periphery of said member being grooved to provide two opposing V-shaped undercut grooves uniformly tapering from maximum depth at opposite sides of said periphery to a flattened inner rim surface at the portions of said periphery midway between the points of maximum groove depth.

2. The frame member of claim 1 wherein one surface of one of the V-shaped grooves is parallel with the other surface of the other of said groove at corresponding opposing points on said periphery.

3. The frame member of claim 1 wherein said inner periphery defines a circular open central area and wherein is included a narrow ledge extending around slightly less than one-half of said periphery and adjacent the plane of said undercut grooves, the ends of said ledge being located adjacent the opposing flattened inner rim surfaces.

4. A lens mount structure comprising a frame member as defined in claim 3 of cast rigid material and including a rigid lens fitting within said circular open central area and supported on said ledge, and a split ring lens-retainer removably fitting within said grooves and against said lens for urging said lens against said ledge.

5. A projection head assembly comprising two lens mount structures as defined in claim 4 disposed to place the two lenses approximately perpendicular to each other.

6. The projection head assembly of claim 5 wherein is included a plane mirror mounted within said assembly for reflecting light from one lens to the other.